(12) United States Patent
Aceves et al.

(10) Patent No.: US 8,655,375 B2
(45) Date of Patent: Feb. 18, 2014

(54) SYSTEM AND METHOD FOR DETERMINING LOCATIONS TO BE STORED IN A LOCATION DATABASE

(75) Inventors: Ralph Aceves, Los Altos Hills, CA (US); Sergio A. Fernandez, Boise, ID (US); Carolina Tamayo Figueroa, Boise, ID (US)

(73) Assignee: Curtiss-Wright Flow Control Service Corporation, Cheswick, PA (US)

( * ) Notice: Subject to any disclaimer, the term of this patent is extended or adjusted under 35 U.S.C. 154(b) by 0 days.

(21) Appl. No.: 13/360,604

(22) Filed: Jan. 27, 2012

(65) Prior Publication Data

US 2012/0122481 A1 May 17, 2012

Related U.S. Application Data

(63) Continuation of application No. 12/253,173, filed on Oct. 16, 2008, now abandoned.

(60) Provisional application No. 61/089,027, filed on Aug. 14, 2008.

(51) Int. Cl.
*H04W 24/00* (2009.01)

(52) U.S. Cl.
USPC ........ 455/456.1; 340/463; 340/988; 340/989; 455/414.1; 455/456.3; 455/456.6; 702/149; 702/150

(58) Field of Classification Search
USPC ......... 340/431, 432, 433, 444, 463, 988, 989, 340/991, 992, 993; 342/116, 200, 207, 113, 342/114; 455/414.1, 456.1, 456.2, 456.3, 455/456.6; 702/149, 150
See application file for complete search history.

(56) References Cited

U.S. PATENT DOCUMENTS

| | | | |
|---|---|---|---|
| 6,480,804 B2 * | 11/2002 | Maeda et al. | 702/150 |
| 6,873,851 B2 * | 3/2005 | Brown et al. | 455/456.3 |
| 7,038,619 B2 * | 5/2006 | Percy et al. | 342/357.52 |
| 8,000,889 B2 * | 8/2011 | Jones | 701/519 |
| 8,138,907 B2 * | 3/2012 | Barbeau et al. | 340/457 |
| 2002/0111172 A1 | 8/2002 | DeWolf et al. | 455/456 |
| 2002/0133545 A1 | 9/2002 | Fano et al. | 709/203 |
| 2006/0253408 A1 | 11/2006 | Dvorak | 707/1 |
| 2008/0125959 A1 * | 5/2008 | Doherty et al. | 701/200 |
| 2010/0063726 A1 * | 3/2010 | Marjenberg et al. | 701/207 |

OTHER PUBLICATIONS

European Search Report, EP Application 09177059, Jun. 30, 2010, 5 pages.

* cited by examiner

*Primary Examiner* — Mahendra Patel
*Assistant Examiner* — Michael S. Bush
(74) *Attorney, Agent, or Firm* — Morgan, Lewis & Bockius LLP

(57) ABSTRACT

A present location of a user is periodically determined. The present location of the user is compared to a previous location of the user. A determination is made as to whether the present location is within a specified distance of the previous location. If the present location is within the specified distance of the previous location, a determination is made as to whether the user has been at the present location for a specified time period. If the user has been at the present location for the specified time period, the present location is stored in a location database.

15 Claims, 9 Drawing Sheets

SYSTEM AND METHOD FOR DETERMINING LOCATIONS TO BE STORED IN A LOCATION DATABASE

RELATED APPLICATIONS

This application is a continuation of and claims priority under 35 U.S.C. §120 to U.S. patent application Ser. No. 12/253,173 filed 16 Oct. 2008, now abandoned entitled "System and Method for Automatically Generating a User Profile From Location Information," by inventor(s) Ralph Aceves, Sergio A. Fernandez, and Carolina Tamayo Figueroa; this application also claims priority under 35 U.S.C. §119 to U.S. Provisional Patent Application No. 61/089,027 filed on Aug. 14, 2008, which applications are incorporated by reference herein in their entirety.

TECHNICAL FIELD

The disclosed embodiments relate generally to determining locations to be stored in a location database.

BACKGROUND

Many applications use information obtained from a profile of a user to provide a customized experience to the user. For example, a job search website may use the profile of the user to generate a list of jobs for which the user may be qualified. Similarly, a social networking website may use the profile of the user to identify other users that may have similar interests as the user.

A profile of a user is typically manually generated by the users themselves. However, as the interests of the user changes, the user must manually change the profile of the user. This process can become burdensome.

Thus, it would be highly desirable to provide a technique for generating profiles of users without the above-described drawbacks.

SUMMARY

To overcome these drawbacks, some embodiments provide a method, a computer readable medium including instructions, and a system for automatically generating a profile of a user. Locations of a user of a mobile device are received, wherein the locations are determined by the mobile device. Types of the locations are identified and a profile of the user is generated based on the types of the locations.

Some embodiments provide a method, a computer readable medium including instructions, and a system for obtaining an alarm database. A mobile device determines a present location of a user and obtains a profile of the user. The mobile device then obtains an alarm database from a server, wherein the alarm database includes points of interest selected based on the profile of the user and the present location of the user.

Some embodiments provide a method, a computer readable medium including instructions, and a system for generating an alarm database. A server receives a present location of a user from a mobile device. The server then receives a profile of the user and generates an alarm database, wherein the alarm database includes points of interest selected based on the profile of the user and the present location of the user.

Some embodiments provide a method, a computer readable medium including instructions, and a system for storing locations in a location database. The mobile device periodically determines a present location of a user and compares the present location of the user to a previous location of the user. The mobile device then determines whether the present location is within a specified distance of the previous location. If the present location is within the specified distance of the previous location, the mobile device determines whether the user has been at the present location for a specified time period. If the user has been at the present location for the specified time period, the mobile device stores the present location in a location database.

Some embodiments provide a method, a computer readable medium including instructions, and a system for adding an entry to a blog. A present location of a user is obtained from a mobile device. A determination is made as to whether the user is a member of a group. If the user is a member of a group, present locations of members of the group are obtained. A subset of the members of the group that are within a specified distance of the present location of the user is determined. An entry to a blog is added, wherein the entry includes a list of the members of the group that are within the specified distance of the present location of the user. In some embodiments, an email is sent to one or more users, a web page is added and/or modified, a short messaging service (SMS) message is sent to one or more users, and/or a multimedia messaging service (MMS) message is sent to one or more users.

BRIEF DESCRIPTION OF THE DRAWINGS

Like reference numerals refer to corresponding parts throughout the drawings.

DESCRIPTION OF EMBODIMENTS

Figure 1:
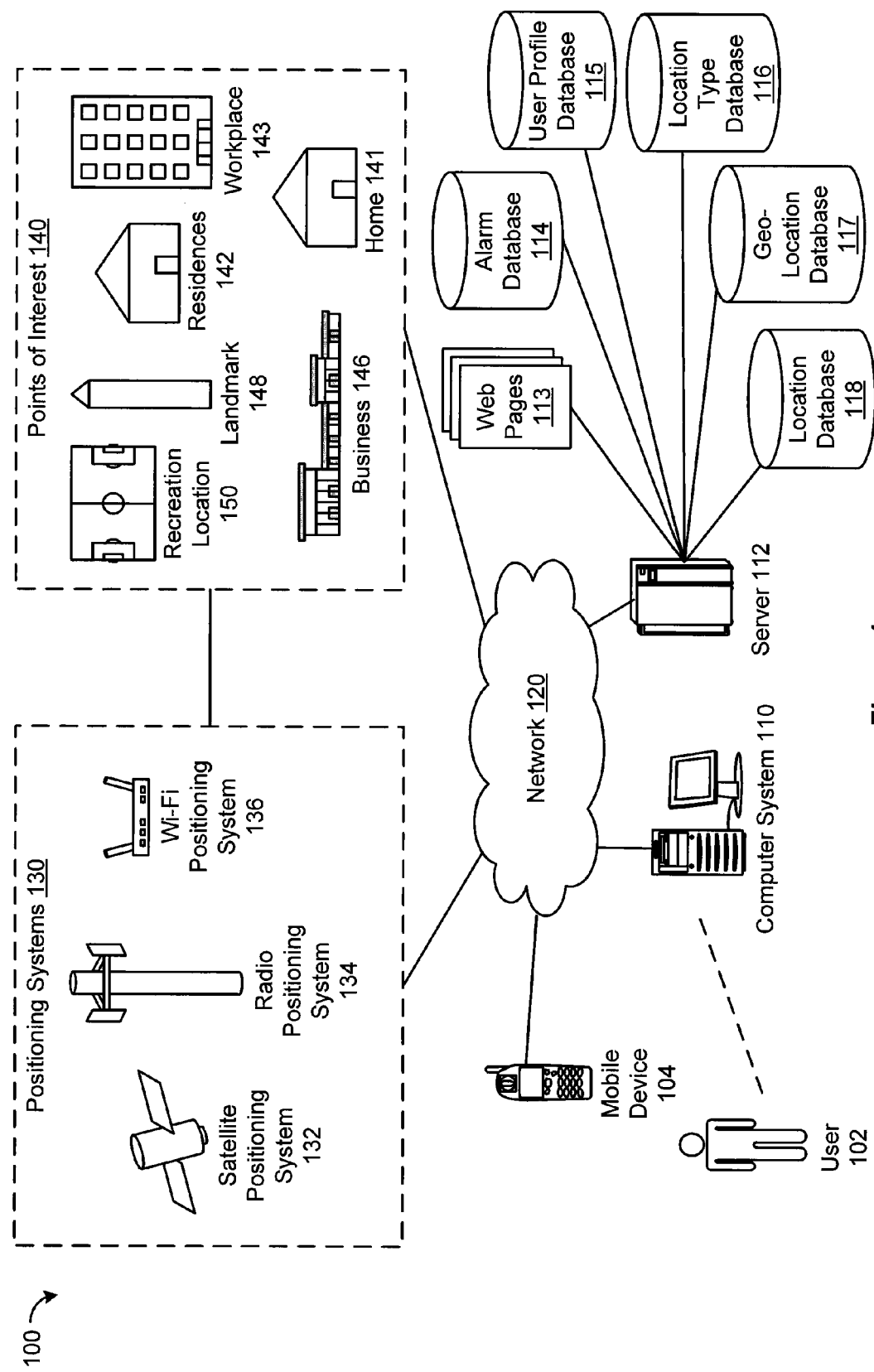
FIG. 1 illustrates a system, according to some embodiments.

FIG. 1 illustrates a system 100, according to some embodiments. The system 100 includes a number of users and a number of mobile devices of the users. As illustrated in FIG. 1, the system 100 includes a user 102 and a mobile device 104 of the user 102. The mobile device 104 may include a mobile phone, a smart phone, a personal digital assistant (PDA), a satellite positioning unit, a handheld computer, a laptop computer, a camera (e.g., digital, film, etc.), a video camera, etc.

The mobile device 104 may communicate with other devices through a network 120. The network 120 may include any type of wired or wireless communication network capable of coupling together computing and/or communication nodes. This includes, but is not limited to, a personal area network, a local area network, a wide area network, or a combination of networks. In some embodiments, the network 120 is a wireless network including: a Bluetooth network, a cellular network, a Wi-Fi network, a WiMAX network, an EDGE network, a 3G network, a 4G network, a CMDA network, a TDMA network, a GSM network, a GPRS network, an EV-DO network, an RTT network, a HSPA network, a UTMS network, a Flash-OFDM network, an iBurst network, etc., and any combination of the aforementioned networks. In some embodiments, the network 120 includes the Internet.

Figure 2:
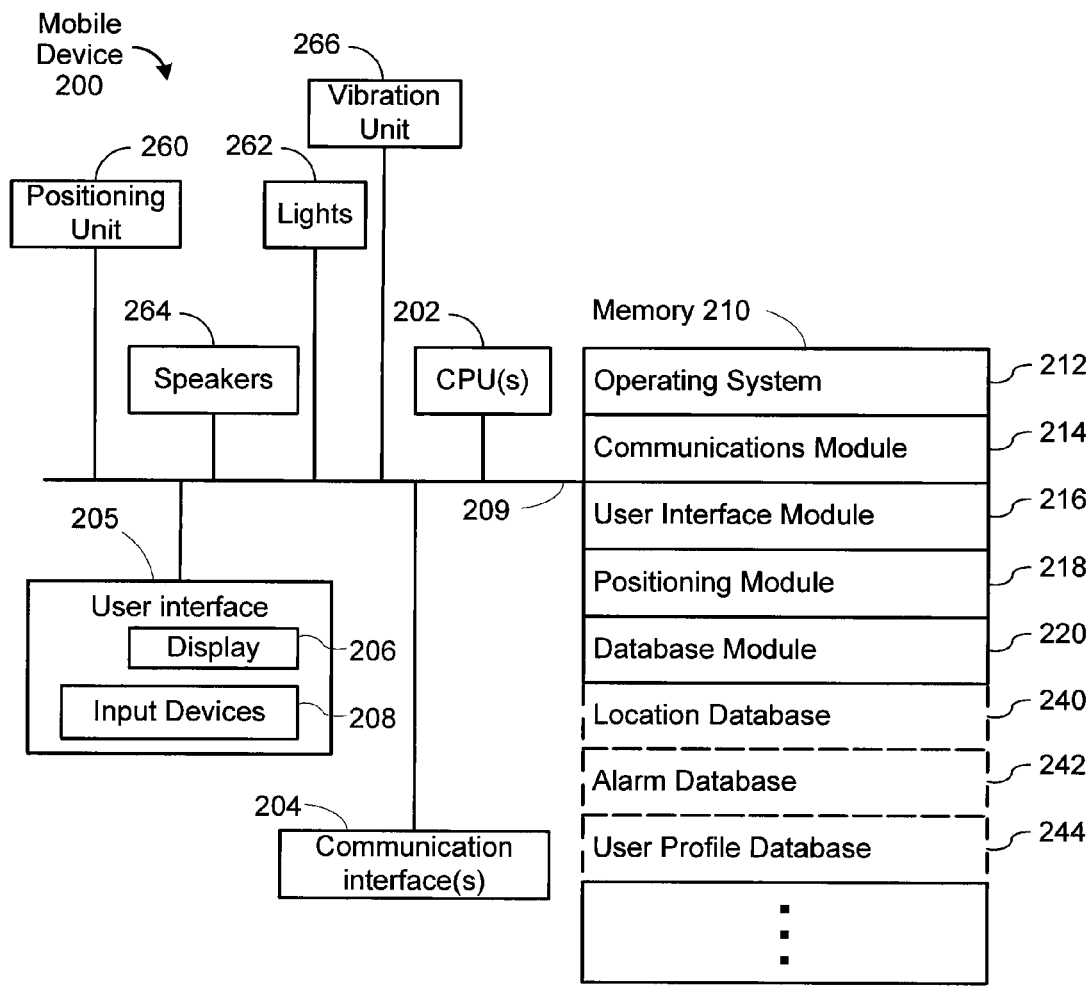
FIG. 2 is a block diagram illustrating a mobile device, according to some embodiments.

FIG. 2 is a block diagram illustrating a mobile device 200 in accordance with one embodiment of the present invention. The mobile device 200 can be the mobile device 104 in FIG. 1. The mobile device 200 typically includes one or more processing units (CPU's) 202, one or more network or other communications interfaces 204, memory 210, one or more communication buses 209 for interconnecting these components, a positioning unit 260 that determines the position of the mobile device 200 using a positioning system as described herein, lights 262 (e.g., status lights), speakers 264 that produce audio sound effects (e.g., voices, music, beeps, alarms, etc.), and a vibration unit 266 that generates vibrations in the mobile device 200. The communication buses 209 may include circuitry (sometimes called a chipset) that interconnects and controls communications between system components. The mobile device 200 optionally may include a user interface 205 comprising a display device 206 and input devices 208 (e.g., keyboard, mouse, touch screen, keypads, etc.). In some embodiments, the mobile device 200 includes one or more of: a camera, a video camera, a sound recorder, and sensors (e.g., accelerometers, magnetometers, etc.). In these embodiments, applications included in memory 210 (e.g., photo applications, video applications, sound recording applications, motion detection applications, navigation applications, positioning applications, etc.) can be used to record information that may be to capture information about a present location of a user. This information may then be uploaded to a blog of a user, emailed to friends of the user, sent via SMS/MMS to friends of the user, etc. Returning to FIG. 2, memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 may optionally include one or more storage devices remotely located from the CPU(s) 202. Memory 210, or alternately the non-volatile memory device(s) within memory 210, comprises a computer readable storage medium. In some embodiments, memory 210 stores the following programs, modules and data structures, or a subset thereof:

an operating system 212 that includes procedures for handling various basic system services and for performing hardware dependent tasks;

a communication module 214 that is used for connecting the mobile device 200 to other computers via the one or more communication interfaces 204 (wired or wireless) and one or more communication networks, such as the Internet, other wide area networks, local area networks, metropolitan area networks, and so on;

a user interface module 216 that receives commands from the user 102 via the input devices 208 and generates user interface objects in the display device 206;

a positioning module 218 that determines the position of the mobile device 200 based on data received from the positioning unit 260;

a database module 220 that interfaces with databases in the mobile device 200;

a location database 240 that includes a plurality of location information (e.g., coordinates, dates, times, etc.) for locations that the user 102 has visited;

an alarm database 242 that includes a plurality of location-based alarms as described herein; and a user profile database 244 that includes profiles of users (e.g., the user 102).

In some embodiments, the position of the mobile device 200 is determined by the computer system 110, the server 112 and/or the positioning system 130.

In some embodiments, one or more of the location database 240, the alarm database 242, and the user profile database 244 are located on the server 112.

Each of the above identified elements may be stored in one or more of the previously mentioned memory devices, and corresponds to a set of instructions for performing a function described above. The set of instructions can be executed by one or more processors (e.g., the CPUs 202). The above identified modules or programs (i.e., sets of instructions) need not be implemented as separate software programs, procedures, or modules, and thus various subsets of these modules may be combined or otherwise re-arranged in various embodiments. In some embodiments, memory 210 may store a subset of the modules and data structures identified above. Furthermore, memory 210 may store additional modules and data structures not described above.

Although FIG. 2 shows a "mobile device," FIG. 2 is intended more as functional description of the various features which may be present in a mobile device than as a structural schematic of the embodiments described herein. In practice, and as recognized by those of ordinary skill in the art, items shown separately could be combined and some items could be separated.

Returning to FIG. 1, the system 100 may also include one or more servers 112 coupled to the network 120. In some embodiments, the server 112 includes web pages 113 (e.g., landing pages, blogs, etc.), an alarm database 114, a user profile database 115, a location type database 116, a geo-location database 117, and a location database 118 as described herein. Furthermore, the server 112 may perform a number of operations as described herein.

Figure 3:
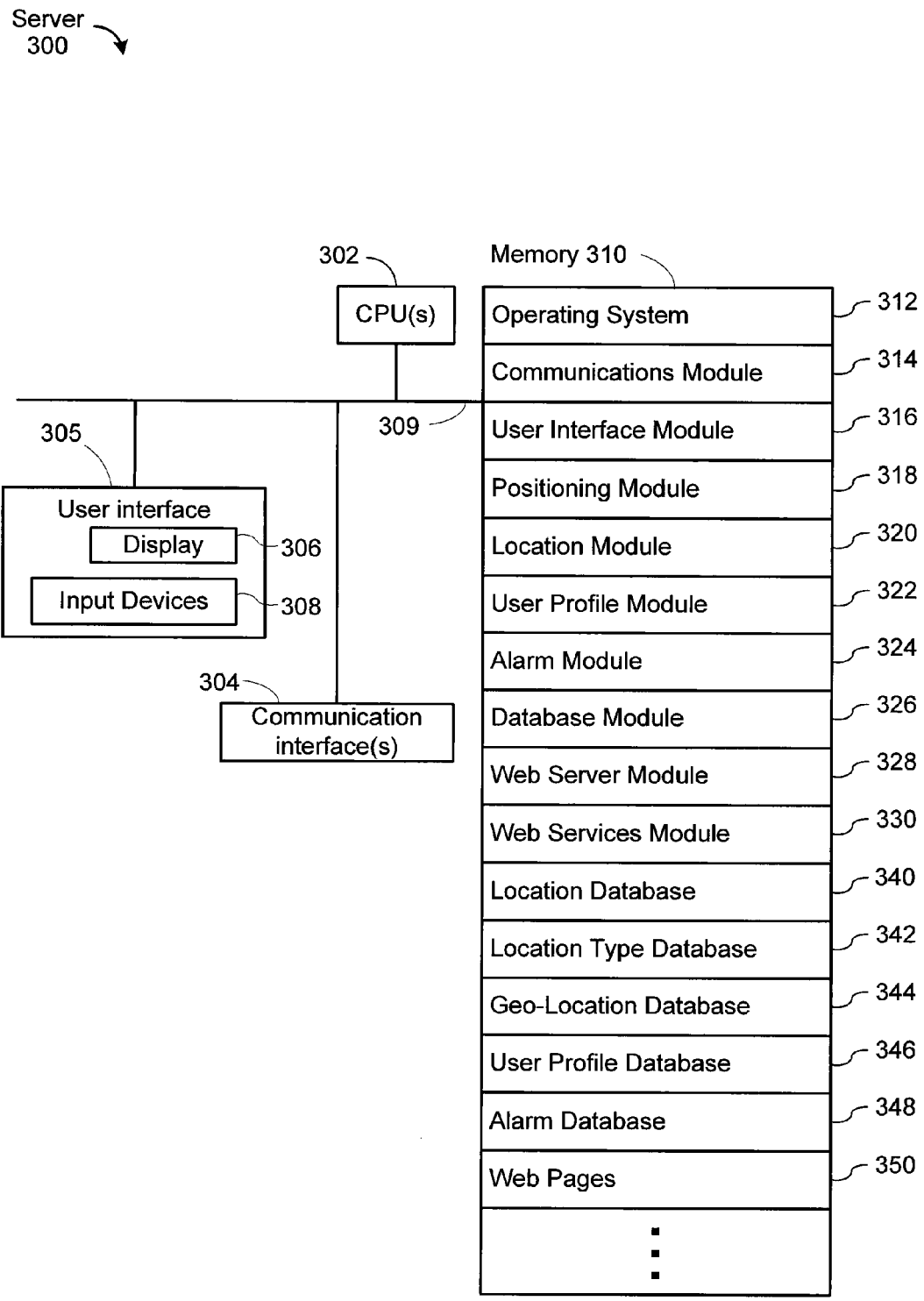
FIG. 3 is a block diagram illustrating a server, according to some embodiments.

FIG. 3 is a block diagram illustrating a server 300 in accordance with one embodiment of the present invention. The server 300 can be the server 112 in FIG. 1. The server 300 typically includes one or more processing units (CPU's) 302, one or more network or other communications interfaces 304, memory 310, and one or more communication buses 309 for interconnecting these components. The communication buses 309 may include circuitry (sometimes called a chipset) that interconnects and controls communications between system components. The server 300 optionally may include a user interface 305 comprising a display device 306 and input devices 308 (e.g., keyboard, mouse, touch screen, keypads, etc.). Memory 310 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 310 may optionally include one or more storage devices remotely located from the CPU(s) 302. Memory 312, or alternately the non-volatile memory device(s) within memory 310, comprises a computer readable storage medium. In some embodiments, the memory 310 stores the following programs, modules and data structures, or a subset thereof:

an operating system 312 that includes procedures for handling various basic system services and for performing hardware dependent tasks;

a communication module 314 that is used for connecting the server 300 to other computers via the one or more communication interfaces 304 (wired or wireless) and one or more communication networks, such as the Internet, other wide area networks, local area networks, metropolitan area networks, and so on;

a user interface module 316 that receives commands from the user 102 via the input devices 308 and generates user interface objects in the display device 306;

a positioning module 318 that receives position information (e.g., coordinates, etc.) from devices (e.g., the mobile device 104) and processes the position information as described herein;

a location module 320 that processes location information (e.g., location coordinates, location types, etc.) as described herein;

a user profile module 322 that generates profiles for users as described herein;

an alarm module 324 that generates an alarm database (e.g., the alarm database 114) as described herein;

a database module 326 that interfaces with databases in the server 300;

a web server module 328 that processes and serves requests for dynamic and/or static web pages (e.g., the web pages 113), documents, video files, image files, etc.;

a web services module 330 that processes requests from the mobile device 200, other servers, computer systems (e.g., the computer system 400), etc., and that provides an interface one or more databases (e.g., the databases described below);

a location database 340 (e.g., the location database 118) that includes a plurality of location information (e.g., coordinates, dates, times, etc.) for locations that the user 102 has visited;

a location type database 342 (e.g., the location type database 116) that includes a plurality of location type (e.g., a type of restaurant, a type of amusement park, a type of museum, a type of business, etc.) for locations that the user 102 has visited;

a geo-location type database 344 (e.g., the geo-location database 117) that includes a mapping between a geographic location (e.g., a coordinate, etc.) and a name (or location type) of the geographic location;

a user profile database 346 (e.g., the user profile database 115) that includes profiles of users (e.g., the user 102)

an alarm database 348 (e.g., the alarm database 114) that includes a plurality of location-based alarms as described herein; and web pages 350 (e.g., the web pages 113) that include static web pages, dynamic web pages (e.g., created on-the-fly by the server 300), blog pages, etc.

In some embodiments, the positioning module 318 receives raw position information (e.g., raw GPS measurements, IP addresses, radio tower locations, etc.) and determines the position (e.g., the coordinates, etc.) of the mobile device 104.

Each of the above identified elements may be stored in one or more of the previously mentioned memory devices, and corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various embodiments. In some embodiments, memory 310 may store a subset of the modules and data structures identified above. Furthermore, memory 310 may store additional modules and data structures not described above.

Although FIG. 3 shows a "server," FIG. 3 is intended more as functional description of the various features that may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement a server and how features are allocated among them will vary from one implementation to another, and may depend in part on the amount of data traffic that the system must handle during peak usage periods as well as during average usage periods.

Returning to FIG. 1, the system 100 may also include a computer system 110 that performs a number of operations as described herein. In some embodiments, the computer system 110 may be a computer system of the user 102. The mobile device 104 may be configured to periodically synchronize with the computer system 110. In doing so, data stored on the mobile device 104 may be replicated and/or reconciled with data on the computer system 110 (and vice versa). Accordingly, the methods 500-900 described with respect to FIGS. 5-9 below can equally apply to the computer system 110.

Figure 4:
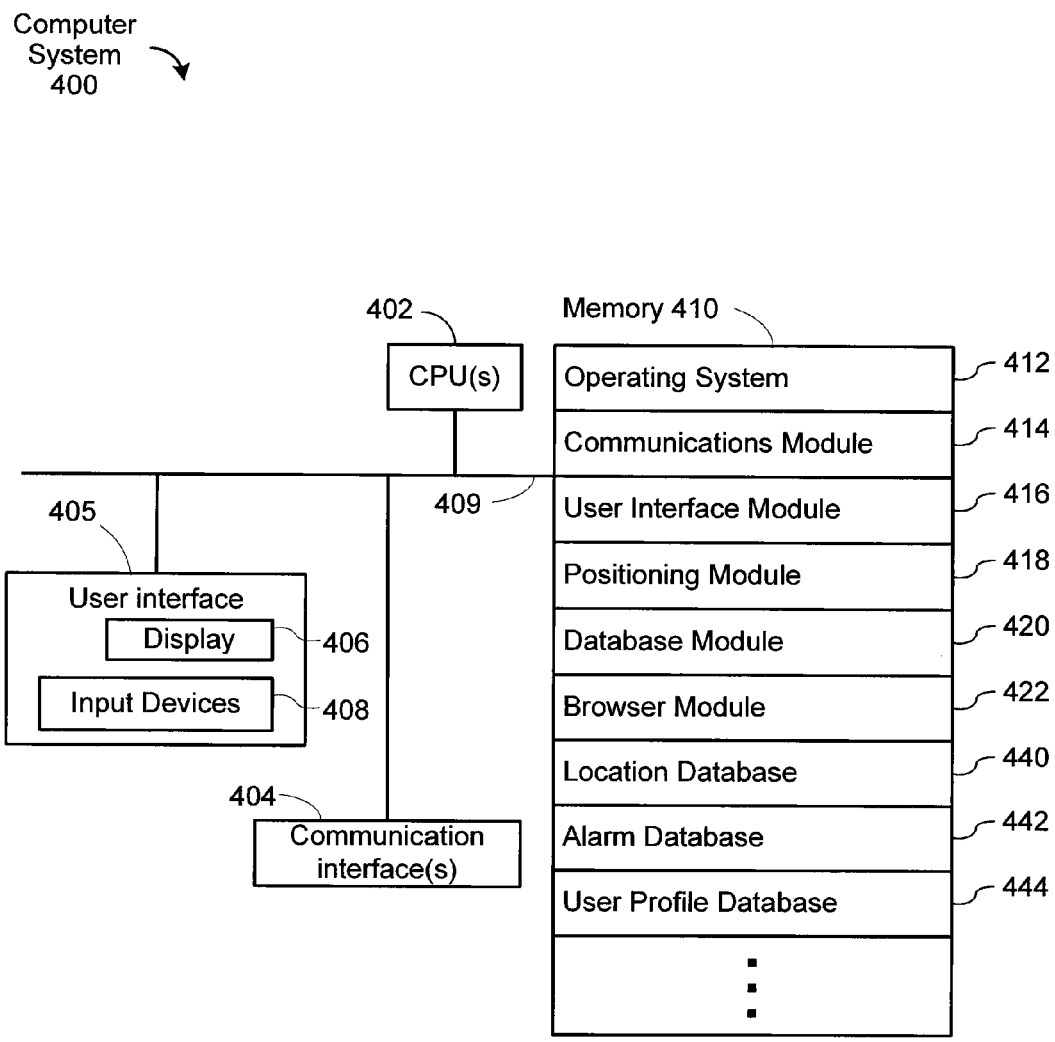
FIG. 4 is a block diagram illustrating a computer system, according to some embodiments.

FIG. 4 is a block diagram illustrating a computer system 400 in accordance with one embodiment of the present invention. The computer system 400 can be the computer system 110 in FIG. 1. The computer system 400 typically includes one or more processing units (CPU's) 402, one or more network or other communications interfaces 404, memory 410, and one or more communication buses 409 for interconnecting these components. The communication buses 409 may include circuitry (sometimes called a chipset) that interconnects and controls communications between system components. The computer system 400 optionally may include a user interface 405 comprising a display device 406 and input devices 408 (e.g., keyboard, mouse, touch screen, keypads, etc.). Memory 410 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 410 may optionally include one or more storage devices remotely located from the CPU(s) 402. Memory 410, or alternately the non-volatile memory device(s) within memory 410, comprises a computer readable storage medium. In some embodiments, memory 410 stores the following programs, modules and data structures, or a subset thereof:

an operating system 412 that includes procedures for handling various basic system services and for performing hardware dependent tasks;

a communication module 414 that is used for connecting the computer system 400 to other computers via the one or more communication interfaces 404 (wired or wireless) and one or more communication networks, such as the Internet, other wide area networks, local area networks, metropolitan area networks, and so on;

a user interface module 416 that receives commands from the user 102 via the input devices 408 and generates user interface objects in the display device 406;

a positioning module 418 that receives position information from devices (e.g., the mobile device 104) and processes the position information as described herein;

a database module 420 that interfaces with databases in the computer system 400;

a browser module 422 that renders text and/or multimedia (e.g., pictures, movies, graphics, etc.) included in web pages 113 (or other files) and displays them on the display device 406;

a location database 440 that includes a plurality of location information (e.g., coordinates, dates, times, etc.) for locations that the user 102 has visited;

an alarm database 442 that includes a plurality of location-based alarms as described herein; and a user profile database 444 that includes profiles of users (e.g., the user 102).

Each of the above identified elements may be stored in one or more of the previously mentioned memory devices, and corresponds to a set of instructions for performing a function described above. The set of instructions can be executed by one or more processors (e.g., the CPUs 402). The above identified modules or programs (i.e., sets of instructions) need not be implemented as separate software programs, procedures or modules, and thus various subsets of these modules may be combined or otherwise re-arranged in various embodiments. In some embodiments, memory 410 may store a subset of the modules and data structures identified above. Furthermore, memory 410 may store additional modules and data structures not described above.

Although FIG. 4 shows a "computer system," FIG. 4 is intended more as functional description of the various features that may be present in a set of computer systems than as a structural schematic of the embodiments described herein. In practice, and as recognized by those of ordinary skill in the art, items shown separately could be combined and some items could be separated. For example, some items shown separately in FIG. 4 could be implemented on single computer systems and single items could be implemented by one or more computer systems. The actual number of computer systems used to implement a computer system and how features are allocated among them will vary from one implementation to another, and may depend in part on the amount of data traffic that the system must handle during peak usage periods as well as during average usage periods.

Returning to FIG. 1, the system 100 includes one or more positioning systems 130. In some embodiments, the one or more positioning systems 130 include a satellite positioning system 132, a radio tower positioning system 134 (e.g., a cell tower positioning system, a Wi-Max positioning system, etc.), a Wi-Fi positioning system 136, and any combination of the aforementioned positioning systems. The one or more positioning systems 130 may determine the position of entities in the system 100. For example, the one or more positioning systems 130 can determine the position of the mobile device 104. Similarly, the one or more positioning systems 130 may determine the position of one or more points of interest 140. In some embodiments, the one or more points of interest 130 include a home 141 (e.g., the home of the user 102), other residences 142 (e.g., any type of residence of the user 102), workplace 143 (e.g., the workplace of the user 102), a business 146, a landmark 148, a recreational location 150, a location at which another user with a substantially similar profile is located (e.g., if the user 102 is a golfer, a point of interest may include the location of another user who is also a golfer), any combination of the aforementioned points of interest.

Generating a Profile of a User

FIGS. 5-9 generally describe methods for automatically generating profiles of users and for using these automatically generated profiles to provide location-based information to the users. For the sake of clarity, these methods are described with respect to the elements of FIG. 1. However, it should be noted that these methods can apply in general to any computer system.

Figure 5:
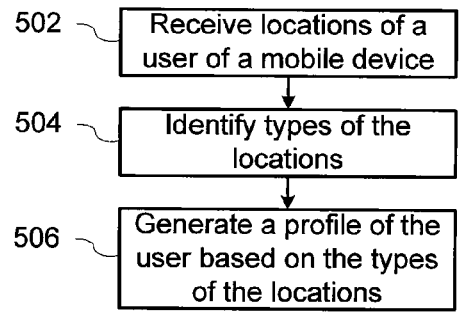
FIG. 5 is a flow diagram of a method for generating a profile of a user, according to some embodiments.

FIG. 5 is a flow diagram of a method 500 for automatically generating a profile of the user 102, according to some embodiments. The method 500 begins when locations of the user 102 of the mobile device 104 are received (502). In some embodiments, the locations are determined by the mobile device 104 using the positioning systems described above (e.g., the positioning systems 130). In some embodiments, the locations are determined by the server 112 using the positioning systems described above (e.g., the positioning systems 130). In some embodiments, the locations are determined by the positioning systems 130.

The types of the locations are identified (504). In some embodiments, identifying a type of a location includes: querying a database that includes a plurality of locations associated with types, querying the user to provide a type of a location, querying a service operator to provide a type of a location, and any combination of the aforementioned operations.

A profile of the user 102 is then generated (506) based on the types of the locations. For example, the profile of the user 102 may include a list of location types such as: library, coffee house, Chinese restaurant, etc., all of which the user 102 has visited. In some embodiments, generating the profile of the user 102 based on the types of the locations includes determining frequencies of occurrence for each type of location. The frequencies of occurrence for each type of location may be used to sort the types of location in the profile of the user 102. For example, if the user 102 visits a coffee house twice a day and a Chinese restaurant once a week, and a library once a month, the profile for the user 102 may include the types of locations sorted as follows: coffee house, Chinese restaurant, library.

In some embodiments, the profile of the user 102 is generated based on locations that the user 102 has visited. For example, the profile of the user 102 may include a first coffee house, a second coffee house, a first movie theater, the workplace 143 of the user 102, the home 141 of the user 102, etc. In other words, the profile of the user 102 includes specified points of interest instead of the types of the points of interest.

In some embodiments, the profile of the user 102 is generated based on the locations that the user 102 has visited and the location types of the locations that the user 102 has visited.

Thus, in these embodiments, the profile of the user 102 is automatically generated or augmented without input from the user 102. It should be noted that the user 102 (and/or an administrator) may manually create or edit the profile of the user 102. In some embodiments, a home of the user 102 and/or a workplace of the user 102 is inferred (508) based on locations of the user, the times of the day that the user was at each of location, and/or the day of the week that the user was at each location. For example, if the user 102 is at a first location from 8 PM until 7 AM, it may be inferred that the first location is the home of the user 102. If the user 102 is at a second location from 8 AM until 6 PM, it may be inferred that the second location is the workplace of the user 102. The profile of the user 102 is then augmented (510) with the inferred location.

In some embodiments, the profile of the user is augmented (512) with the frequencies of occurrence for each location. These frequencies can be used to determine a relative importance of a location. For example, if the user 102 visited a coffee house twenty times, the coffee house may be an important location to the user 102. If the user 102 visits a library once, then the library may not be an important location to the user 102. The location type may also be relevance to a determination of a location's importance.

In some embodiments, the profile of the user is augmented (514) with amounts of time the user was at each type of location. The amount of time that the user 102 spends at a particular type of location may indicate the importance of a location and/or its type. For example, if the user 102 spends ten minutes at a coffee house, it can be inferred that the user enjoys coffee (e.g., the user 102 may be purchasing coffee). In contrast, if the user 102 spends one minute at the coffee house, it may be inferred that the user 102 may be passing through the coffee house to go to another location.

In some embodiments, the profile of the user is augmented (516) with the amount of time the user was at each location. In contrast to the embodiments described with respect to element 514, these embodiments track the amount of time that the user 102 was at a particular location. For example, the user 102 may spend ten minutes at a first coffee house and thirty seconds at a second coffee house. Thus, it may be inferred that the user 102 bought coffee at the first coffee house and walked through, but did not make a purchase, at the second coffee shop. This information can be used to determine the importance of a location to the user 102.

A location may be associated with an event at the location. For example, a user may be at a theater at a particular day and time, which may correspond to a particular play being performed. Thus, in some embodiments, the profile of the user is augmented with a type of event that is identified for each location. For example, the type of events may include: a movie, a play, an opera, a musical, a sporting event, a celebration (e.g., wedding, birthday party, etc.), a concert, etc.

Alarm Database

Once a profile of the user 102 is generated (and/or augmented), location-based services can be provided. In some embodiments, the location-based services are provided based on a present location of the user 102 and an alarm database. The alarm database may include documents (e.g., web pages, blogs, photos, videos, sounds, etc.), products, services, and/or promotions (e.g., coupons, sales, etc.), that are associated with one or more locations or one or more location types. For example, the alarm database may include a coupon for coffee at a first coffee house. This coupon may be linked to the geographic location of the first coffee house and/or to a location type "coffee house." Thus, if the profile of the user 102 indicates that the user frequents coffee houses, the coupon may be displayed to the user. Similarly, if the profile of the user 102 indicates that the user frequents coffee houses, the coupon may be displayed to the user if the user is at the first coffee house and/or at a coffee house not associated with the first coffee house. In some embodiments, the documents, products, services, and/or promotions are presented to the user 102 at the time of purchase. For example, a coupon may be presented to the user 102 as the user is making a purchase. In some embodiments, the documents, products, services, and/or promotions are presented to the user 102 prior to a purchase. In these embodiments, the user 102 may decide to purchase a different product or service based on the presentation of the products, services, and/or promotions.

In some embodiments, the alarm database is customized to the user 102. Thus, only points of interest that substantially match the profile of the user 102 are included in an alarm database for the user 102. Accordingly, the alarm database may only include a subset of the alarm database 112 that may interest the user 102.

Furthermore, the alarm database can be populated with alarms that have been purchased and/or otherwise provided by businesses, organizations, and/or individuals. Similarly, the alarm database can be populated with alarms that have not be purchased.

Figure 6:
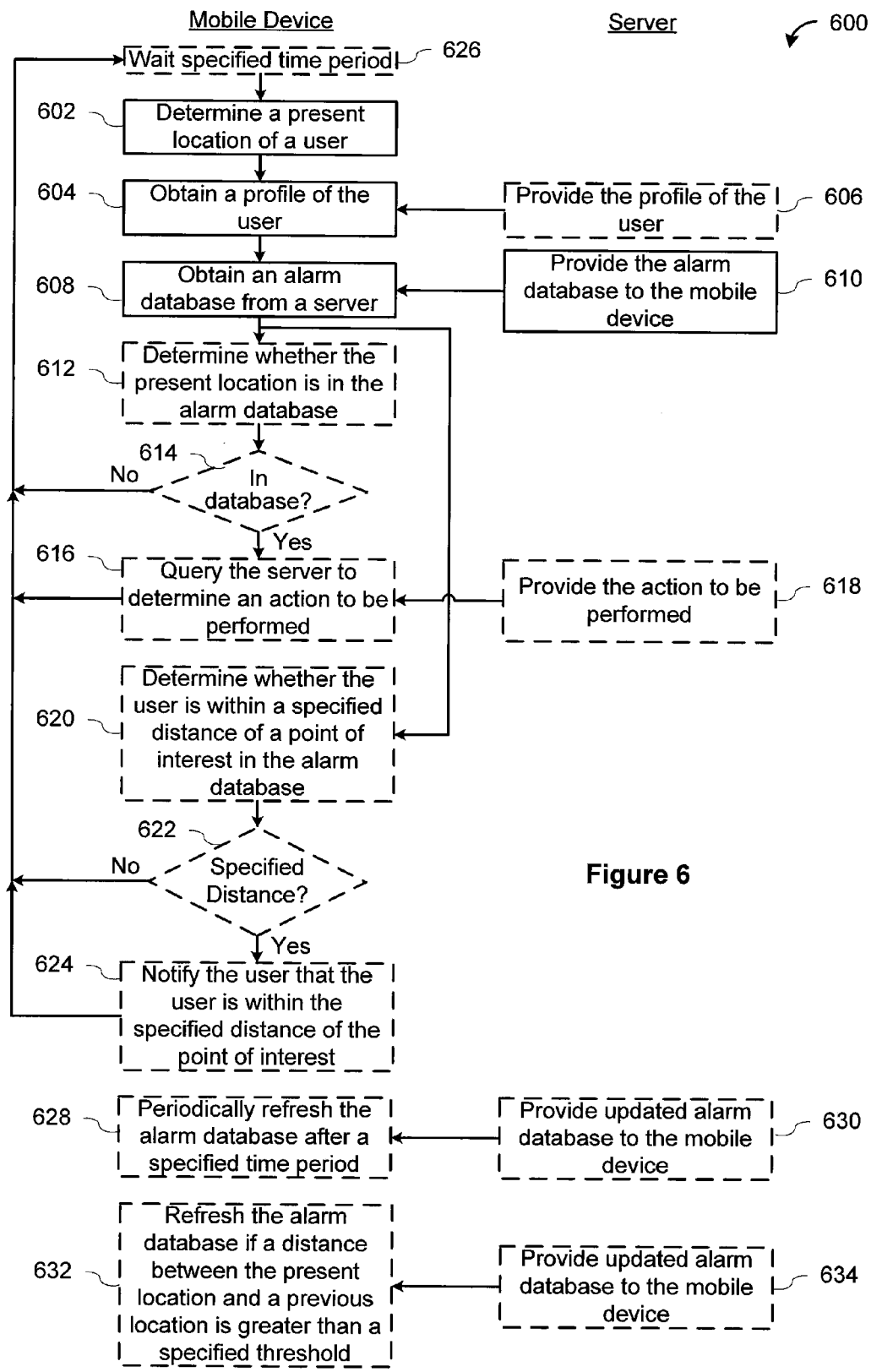
FIG. 6 is a flow diagram of a method for obtaining an alarm database, according to some embodiments.

FIG. 6 is a flow diagram of a method 600 for obtaining an alarm database, according to some embodiments. The method 600 begins when the positioning module 218 of the mobile device 104 determines and/or otherwise obtains (602) a present location of the user 102. As described above, the positioning module 218 of the mobile device 104 may determine the present location of the user 102 using the positioning systems 130.

The mobile device 104 then obtains (604 and 610) a profile of the user 102. In some embodiments obtaining the profile of the user 102 includes obtaining the profile of the user 102 from the mobile device 104 (e.g., from memory of the mobile device 104). In some embodiments, obtaining the profile of the user 102 includes obtaining the profile of the user 102 from the server 112.

The mobile device 104 obtains (608 and 610) an alarm database from the server 112, wherein the alarm database includes points of interest selected based on the profile of the user 102 and the present location of the user 102. In some embodiments, the alarm database on the mobile device 104 is updated by the server 112.

In some embodiments, the mobile device 104 determines (612) whether the present location is in the alarm database. If the present location is in the alarm database (614, Yes), the mobile device 104 queries (616 and 618) the server 112 to determine an action to be performed. For example, the action may include notifying the user 102 that the user is at a location in the alarm database. In some embodiments, the mobile device 104 queries the alarm database to determine an action to be performed. If the present location is not in the alarm database (614, No), the mobile device 104 may wait (626) a specified time period before returning to step 602.

In some embodiments, the mobile device 104 determines (620) whether the user 102 is within a specified distance from a point of interest in the alarm database. If the user 102 is within the specified distance from a point of interest in the alarm database (622 Yes), the mobile device 104 notifies (624) the user 102 that the user 102 is near and/or within the specified distance of the point of interest. If the user 102 is not within the specified distance of a point of interest in the alarm database (622, No), the mobile device 104 may wait (626) a specified time period before returning to step 602.

In some embodiments, notifying the user 102 includes: notifying the user 102 using a visual indication on the mobile device 104, notifying the user 102 using a audio indication on the mobile device 104, notifying the user 102 using a vibration on the mobile device 104, notifying the user 102 on a computing device (e.g., the computer system 110) that has been synchronized with the mobile device 104, notifying the user 102 on custom web page (e.g., a blog, etc.); and any combination of the aforementioned operations.

In some embodiments, the visual indication includes: specified text displayed on the display device 206 the mobile device 104, a short messaging service (SMS) message and/or a multimedia messaging service (MMS) message displayed on the display device 206 of the mobile device 104, an electronic mail message displayed on the display device 206 the mobile device 104, one or more flashing lights 262 on the mobile device 262, a light 262 with a changing color on the mobile device 104, and any combination of the aforementioned visual indications.

In some embodiments, the audio indication includes a specified sound generated by the speakers 264 of the mobile device 104, a phone call on the mobile device 104, and any combination of the aforementioned audio indications.

In some embodiments, the mobile device 104 periodically refreshes (628) the alarm database after a specified time period. For example, the mobile device 104 may receive (630) an updated alarm database from the server 112 and/or changes to an existing alarm database.

If a user travels a long distance (e.g., via airplane), the alarm database may not reflect the alarms that are applicable to the present location of the user. Thus, in some embodiments, the mobile device 104 refreshes (632) the alarm database if a distance between the present location and a previous location is greater than a specified threshold. Again, the mobile device 104 may receive (634) the alarm database from the server 112.

Figure 7:
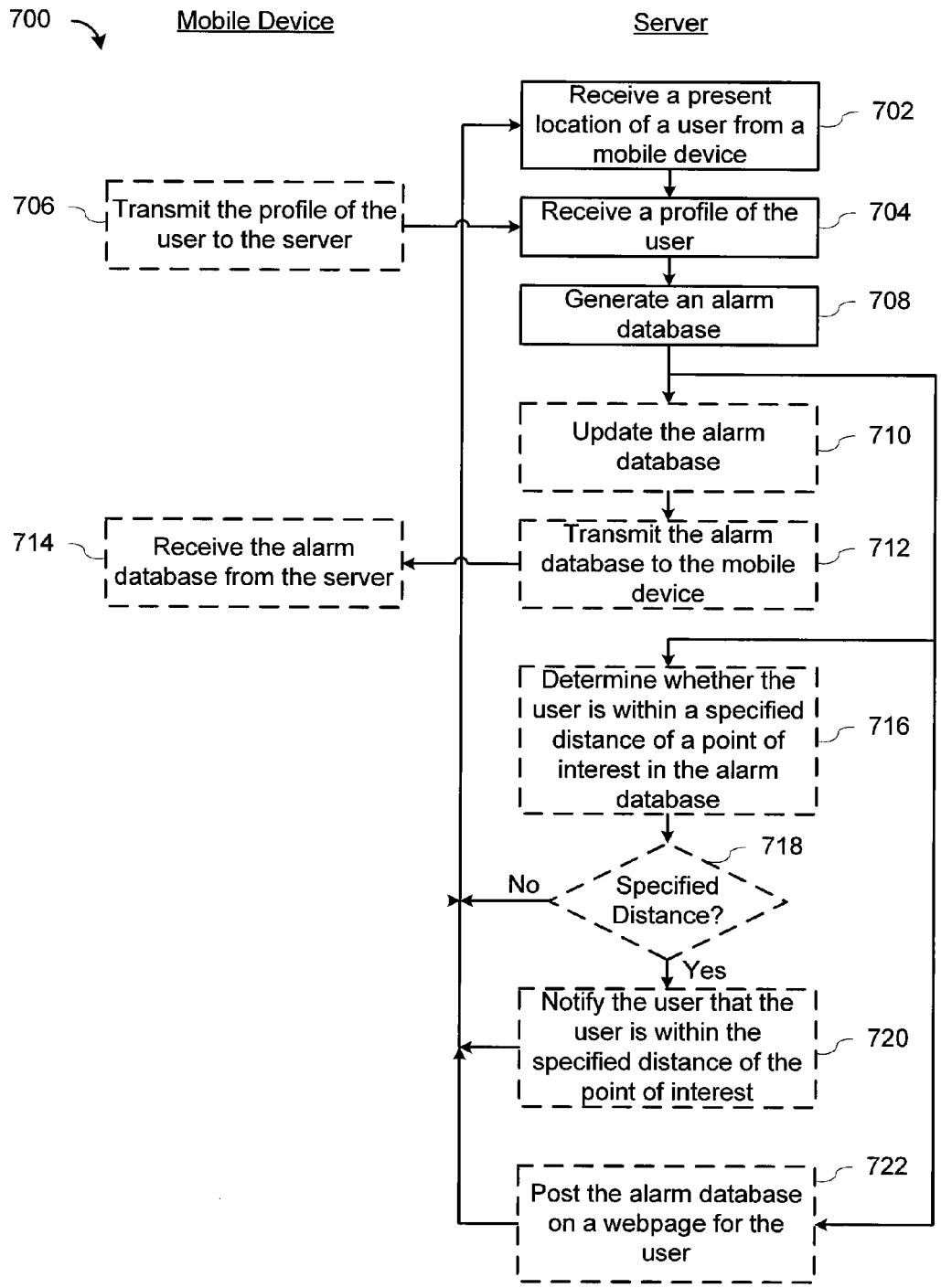
FIG. 7 is a flow diagram of a method for generating an alarm database, according to some embodiments.

FIG. 7 is a flow diagram of a method 700 for generating an alarm database, according to some embodiments. The method 700 begins when the server 112 receives (702) a present location of the user 102 from the mobile device 104. The server 112 then receives (704) a profile of the user 102. In some embodiments, the profile of the user 102 is transmitted (706) from the mobile device 104 to the server 112. In some embodiments, the profile of the user 102 is received from the server 112.

The server 112 then generates (708) an alarm database, wherein the alarm database includes points of interest selected based on the profile of the user 102 and the present location of the user 102. In some embodiments, generating the alarm database includes querying a global alarm database (e.g., the alarm database 114) to determine points of interests that are within a specified distance of the present location and that substantially match the profile of the user 102. Thus, an alarm database for the user 102 when the user 102 is in Paris, France may be different that the alarm database for the user 102 when the user 102 is in San Francisco, Calif. In some embodiments, the alarm database is generated based on the capabilities of the device 104. For example, the size of the alarm database may be reduced or increased based on the memory and/or the processing power of the device 104.

In some embodiments, the server 112 updates (710) the alarm database and transmits (712) the alarm database to the mobile device 104. The mobile device 104 then receives (714) the alarm database from the server 112.

The alarm database may be updated under several conditions. For example, the alarm database may be updated periodically, the alarm database may be updated in response to an update request from the mobile device 104, when the present location of the mobile device 104 changes by a specified distance, and/or the alarm database may be updated when the global alarm database is updated.

In some embodiments, the server 112 determines (716) whether the user 102 is within a specified distance of a point of interest in the alarm database. If the user 102 is within the specified distance of a point of interest in the alarm database (718, Yes), the server 112 notifies (720) the user 102 that the user 102 is near and/or within the specified distance of the point of interest. Otherwise, the method 700 returns to step 702. For example, the user 102 can be notified on the mobile device 104 using any of the notification operations described above.

In some embodiments, the server 112 posts (722) the alarm database on a webpage for the user 102. For example, the server 112 can post the alarm database (or individual alarms of the alarm database) on a blog of the user 102. Similarly, the server 112 can post the alarm database on a profile page of the user 102. In some embodiments, the alarm database is updated based on the day and/or the time of day. For example, during the weekdays, the alarm database may include business-related alarms. In contrast, during the weekends, the alarm database may include recreation-related alarms. Similarly, the alarm database during at night may include night locations (e.g., movie theaters, restaurants, bars, etc.), whereas the alarm database during the day may include day locations (e.g., retail locations, museums, etc.).

In some embodiments, the profile of the user 102 may be edited by the user 102. For example, the user 102 may edit the profile so that particular locations (e.g., Starbucks, Coffee Bean, etc.) and/or location types (coffee house, library, etc.) are or are not displayed and/or used. Similarly, the user 102 may edit the profile by adding location, location types, categories, etc.

Storing Locations

As discussed above, not all location that a user visits may be "interesting." For example, a user may only be passing through a location on the way to an interesting location. Furthermore, even if a user stays in a location for a specified amount of time, the location may still not be interesting. For example, if a user is waiting in traffic, the fact that the user has been at a location for a specified time period does not infer that the user is at an interesting location. Thus, not all locations need to be tracked or stored in a location database.

Figure 8:
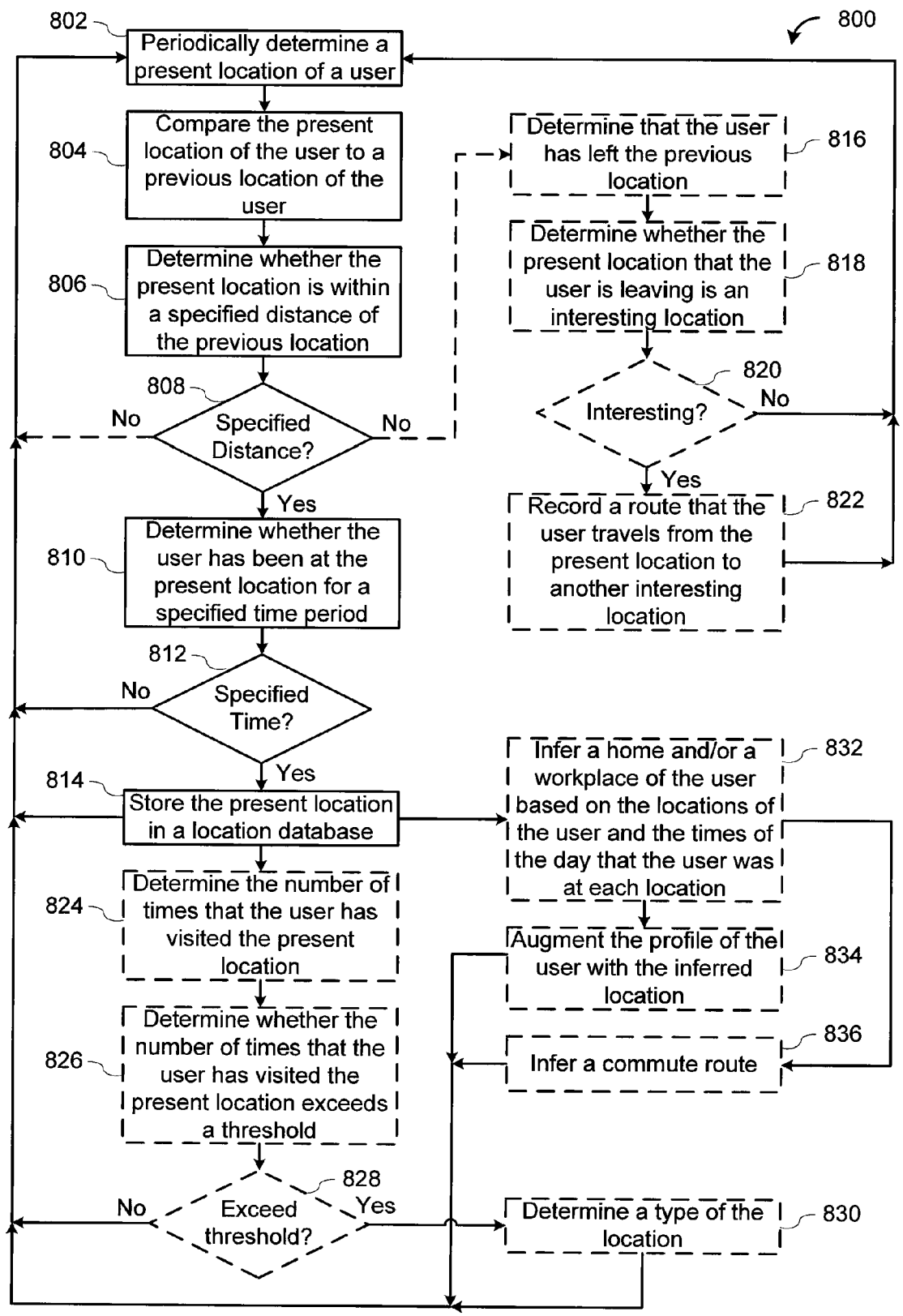
FIG. 8 is a flow diagram of a method for determining locations to be stored in a location database, according to some embodiments.

FIG. 8 is a flow diagram of a method 800 for determining locations to be stored in a location database, according to some embodiments. Note that the method 800 is described with respect to the mobile device 104. However, some or all of the method 800 may be performed by the server 112.

The method 800 begins when the mobile device 104 (and/or the server 112) periodically determines (802) a present location of the user 102. In some embodiments, the present location of the user 102 is determined at a period that is determined based on: the remaining power of the mobile device 104, the speed at which the user 102 is moving, the type of location, the prior behavior of the user 102, the time of day, the day of the week, and any combination of the aforementioned factors. For example, if the remaining power of the mobile device 104 is low, the time interval at which the present location of the user 102 is determined may be increased to conserve power. If the user 102 is in a fast moving vehicle, the time interval at which the present location of the user is determined may be decreased to increase the sampling rate of the locations the user visited. If the location includes a number of sub-locations (e.g., a mall may include a number of stores), the time interval at which the present location of the user 102 is determined may be decreased to be able to increase the sampling rate of the locations the user visited.

The mobile device 104 (and/or the server 112) then compares (804) the present location of the user 102 to a previous location of the user 102 and determines (806) whether the present location is within a specified distance of the previous location. In some embodiments, the specified distance dynamically varies based on: the speed at which the user 102 is moving, the type of location, the prior behavior of the user 102, and any combination of the aforementioned factors.

If the present location is within the specified distance of the previous location (808, Yes), the mobile device 104 (and/or the server 112) determines (810) whether the user 102 has been at the present location for a specified time period. In some embodiments, the specified time period dynamically varies based on: the day of week, the time of day, the prior behavior of the user 102, the remaining power of the mobile device, whether the present location exists in the location database, and any combination of the aforementioned factors. For example, during the weekdays, the specified time period may be increased because the user 102 may be more likely to stay at a single location (e.g., home or work).

If the user 102 has been at the present location for the specified time period (812, Yes), the mobile device 104 (and/or the server 112) stores (814) the present location in a location database. If the user 102 has not been at the present location for the specified time period (812, No), the method 800 returns to step 802.

In some embodiments, if the present location is not within the specified distance of the previous location (808, No), the method 800 returns to step 802.

In some embodiments, if the present location is not within the specified distance of the previous location (808, No), the mobile device 104 (and/or the server 112) determines (816) that the user 102 is leaving the present location. The mobile device 104 (and/or the server 112) then determines (818) whether the present location that the user 102 is leaving is an interesting location. In some embodiments, an interesting location includes locations that have been visited by one or more users a specified number of times. A database of interesting locations may be obtained from applications that may or may not be related to the applications described herein. These applications may be used to collect information about locations that users have visited and transmit them to a server (e.g., the server 300, or any other server) to be recorded and/or analyzed. For example, one such application is an application that tracks and reports the present location of friends. This friend tracking application may receive the present location of users from a mobile device of the user for the purpose of reporting it to friends of the user. However, in addition, the mobile device of the user may also obtain information about the time of day the user was at a location, the day the user was at a location, the duration that the user was at the location, etc. This location information may then be used to determine whether a given location (in aggregation with location information obtained from other users) is interesting. Other application include a ride sharing application that allows users to setup carpools with other users that have similar commute routes (e.g., the commute routes may be determined as described herein or manually entered, etc.) and an application that tracks the workout routes of a user (e.g., running, biking, hiking, etc.).

Returning to FIG. 8, if the present location that the user 102 is leaving is an interesting location (820, Yes), the mobile device 104 (and/or the server 112) records (822) a route that the user 102 travels from the present location that the user 102 is leaving to another interesting location. If the present location that the user 102 is leaving is not an interesting location (820, No), the method 800 returns to step 802.

In some embodiments, the mobile device 104 (and/or the server 112) records the route that the user 102 travels from the present location that the user 102 is leaving to another interesting location by determining whether the user 102 has stopped moving. If the user has stopped moving, the mobile device 104 (and/or the server 112) determines whether the user 102 has stopped at an interesting location. In some embodiments, the mobile device determines whether the user 102 has stopped moving by determining whether the user 102 has stopped moving for a specified time period.

If the user 102 has stopped at an interesting location, the mobile device 104 (or the server 112) records the route that the user 102 traveled from the present location to the interesting location. Once a route has been determined, brief stops along the route may be inferred as interesting locations. In some embodiments, only brief stops along the determined route may be classified as interesting locations. The time period for a "brief stop" may configurable and/or may be automatically selected based on metrics (e.g., based on the day of the week, the time of day, the speed that a user is traveling, the type of locations along the route, etc.) For example, the time period for a brief stop may be longer during commute hours to account for potential traffic delays (e.g., a location in the middle of a highway may not be an interesting location) than the time period for a brief stop if the user is walking.

In some embodiments, the mobile device 104 (and/or the server 112) infers (832) a home of the user and/or a workplace of the user based on locations of the user, the times of the day that the user was at each of location, and/or the location type. The mobile device 104 (and/or the server 112) then augments (834) a profile of the user 102 with the inferred location. In some embodiments, the mobile device 104 (and/or the server 112) infers (836) a commute route based on the route the user travels between the home 141 and the workplace 143. This route may be stored in the profile of the user 102 and used to generate alarms. For example, one such alarm indicates that other users travel the same commute route as the user 102. Thus, the user 102 may contact those other users to arrange a carpool. In some embodiments, the user 102 (or an administrator) may edit the inferred location.

An interesting location may be determined based on the number of times the user 102 has visited the location. Thus, in some embodiments, the mobile device 104 (and/or the server 112) determines (824) the number of times that the user has visited the present location. The mobile device 104 (and/or the server 112) then determines (826) whether the number of times that the user 102 has visited the present location exceeds a threshold. If the number of times that the user 102 has visited the present location exceeds the threshold (828, Yes), the mobile device 104 (and/or the server 112) determines (830) a type of the present location. If the number of times that the user 102 has visited the present location does not exceed the threshold (828, No), the method 800 returns to step 802.

In some embodiments, determining a type of the present location includes: querying a database that includes a plurality of locations associated with types, querying the user to provide a type of a location, querying a service operator to provide a type of a location, and any combination of the aforementioned operations.

In some embodiments, the mobile device 104 (and/or the server 112) stores the times during which the user is at the present location.

In some embodiments, a size of a location is determined by collapsing adjoining locations into a single location. These embodiments account for the inaccuracy and/or limited resolution of positioning systems (e.g., GPS, etc.), and for the discrete sizes of locations. For example, a coffee house may have coordinates that span a specified area. Similarly, the position of the coffee house may be reported differently based on the positioning system used (e.g., due to variations in resolution and/or accuracy of the positioning system used, etc.).

Adding an Entry to a Blog of a User

Figure 9:
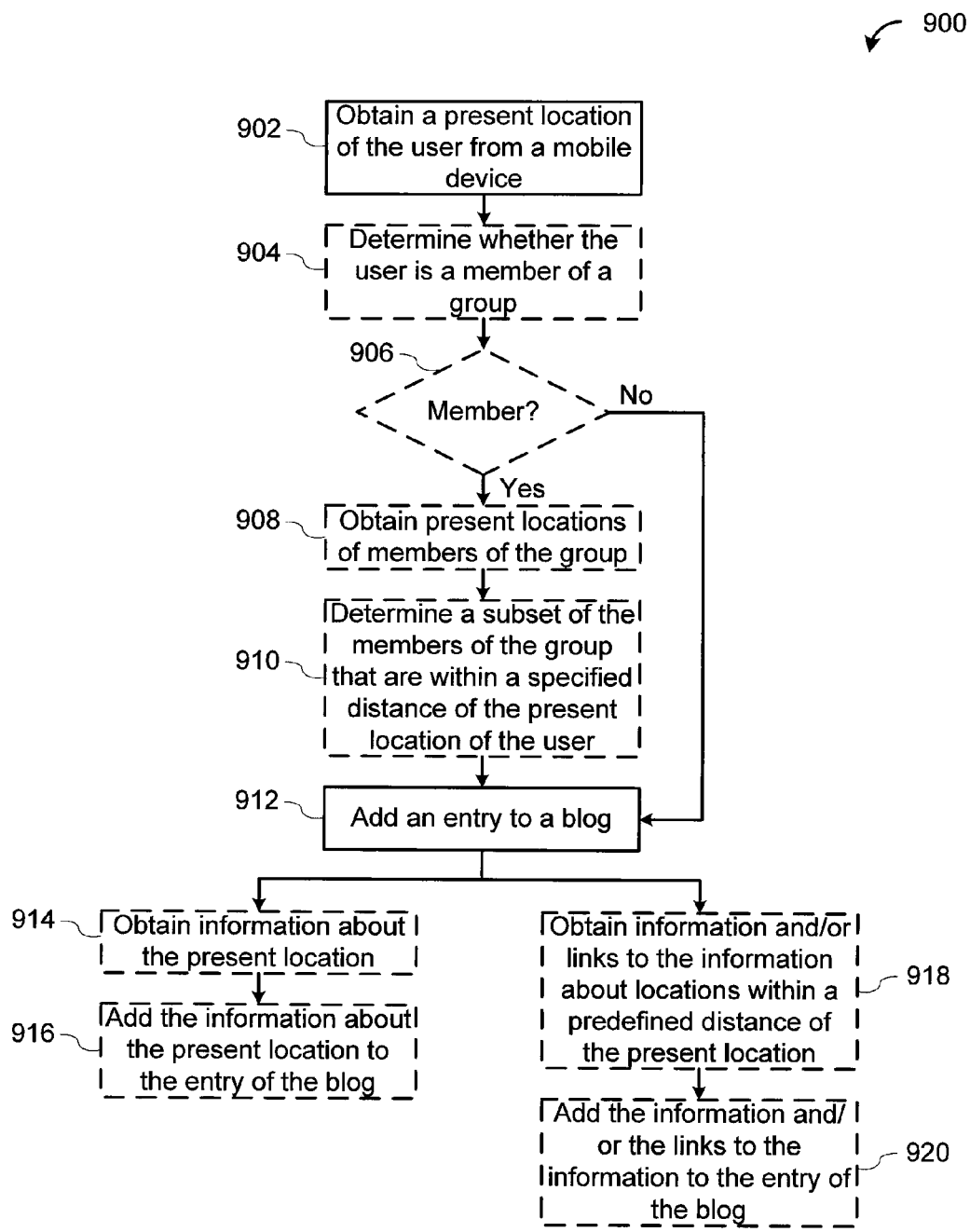
FIG. 9 is a flow diagram of a method for adding an entry to a blog based on a location of the user, according to some embodiments.

The user 102 may have a blog that informs friends of the user 102 of news about the user 102. For example, the user 102 may have a travel blog that chronicles the travels of the user 102. Thus, some embodiments, automatically add entries to a blog based on the present location of the user and/or the profile of the user. FIG. 9 is a flow diagram of a method 900 for adding an entry to a blog based on a location of the user 102, according to some embodiments. The method 900 begins when a present location of the user 102 is obtained (902) from the mobile device 104. An entry to a blog is added (912). This entry may include information about the present location of the user 102 and/or links to information about the present location of the user 102. In some embodiments, in addition to or instead of adding an entry to the blog, an email is sent to one or more users, a web page is added (e.g., a static web page, a web page of the user 102 in a social network application, etc.), a short messaging service (SMS) message is sent to one or more users, and/or a multimedia messaging service (MMS) message is sent to one or more users.

In some embodiments, a determination (904) is made as to whether the user 102 is a member of a group. If the user 102 is a member of a group (906, Yes), present locations of members of the group are obtained (908). In some embodiments, the present locations of the members of the group are obtained from mobile devices of the members of the group.

In some embodiments, a group is dynamically created based on the profile of users. For example, if the profile of the user 102 indicates that the user 102 like to golf, the user 102 may be added to a group of golfers. Similarly, if the profile of the user 102 indicates that the user 102 likes to golf and likes fine dining, the user 102 may be added to a group of golfers that enjoys fine dining. A group may also be created based on profiles of users and the present location of users. For example, if the user 102 is in Paris, France, the user 102 can be added to the group of golfers that are located in Paris, France.

In some embodiments, a group is dynamically created based on the proximity of users of mobile devices. For example, if several users are within a specified distance (e.g., 30 feet) of the user 102, those users may be considered a group.

In some embodiments, a group is dynamically created based on the proximity of users of mobile devices and historical interactions between the users. Consider a group of users that are within a specified distance of the user 102. These users are not associated with a group unless these users have had previous interactions with each other. For example, these previous interactions may include emails sent between the users, SMS/MMS messages sent between the users, photos sent between the users, phone calls placed between the users, users that have been within a specified distance of each other in previous occasions, users with similar profiles, etc. Thus, users that happen to be in the same area (e.g., a crowded room) that have no relationship to each other are not placed in a group unless there have been historical interactions between those users.

A subset of the members of the group that are within a specified distance of the present location of the user 102 is determined (910). An entry to a blog is added (912), wherein the entry includes a list of the members of the group that are within the specified distance of the present location of the user.

If the user 102 is not a member of a group (906, No), an entry to a blog of the user may be added.

In some embodiments, information about the present location is obtained (914). The information about the present location is added (916) to the entry of the blog.

In some embodiments, the blog includes: a blog for the user, a blog for the group, a blog for a member of the group, and any combination of aforementioned blogs.

In some embodiments, information and/or links to the information about locations within a predefined distance of the present location are obtained (918). The information and/or the links to the information are added (920) to the entry of the blog.

In some embodiments, the information about a respective location includes: historical information, an address of the respective location, phone numbers of the respective location, GPS coordinates of the respective location, coupons associated with the respective location, hours of operation of the respective location, fees associated with the respective location, restrictions of the respective location, reviews of the respective location, ratings of the respective location, and any combination of the aforementioned information.

In some embodiments, multimedia content generated by the mobile device 104 at the present location are added to the entry of the blog. The multimedia content may include photos, videos, text, audio, etc. Location information for the present location may also be added to the files (e.g., as metadata, etc.) associated with the multimedia content. In doing so, even if the multimedia content is downloaded from the blog entry, the location information may be determined from the files associated with the multimedia content.

The methods 500-900 may be governed by instructions that are stored in a computer readable storage medium and that are executed by one or more processors of one or more servers. Each of the operations shown in FIGS. 5-9 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

Furthermore, the methods 500-900 may be performed in real-time or may be post-processed using historical location information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for determining locations to be stored in a location database, comprising:
    at a mobile device,
        periodically determining a present location of a user, the present location being one of an interesting location and an uninteresting location;
        comparing the present location of the user to a previous location of the user;
        determining whether the present location is within a specified distance of the previous location;
        in accordance with a determination that the present location is within the specified distance of the previous location:
            determining whether the user has been at the present location for a specified time period; and in accordance with a determination that the user has been at the present location for the specified time period, storing the present location in a location database;

in accordance with a determination that the present location is beyond the specified distance of the previous location:

determining whether the previous location that the user is leaving is an interesting location, wherein an interesting location includes locations that have been visited by one or more users of a plurality of users a specified number of times, wherein the plurality of users includes the user of the mobile device;

in accordance with a determination that the previous location that the user is leaving is an interesting location, recording a route that the user travels from the previous location that the user is leaving to another interesting location; and in accordance with a determination that the previous location is an uninteresting location, not recording a route that the user travels from the previous location until an interesting location is reached.

2. The method of claim 1, including storing the times during which the user is at the present location.

3. The method of claim 2, including inferring, based on locations of the user and the times of the day that the user was at each location, one selected from the group consisting of:
a home of the user;
a workplace of the user; and
any combination of the aforementioned locations.

4. The method of claim 3, including inferring a commute route based on the route the user travels between the home and the workplace.

5. The method of claim 1, wherein if the present location is not within the specified distance of the previous location, the method includes determining that the user has left the previous location.

6. The method of claim 1, wherein the specified distance dynamically varies based on one selected from the group consisting of:
the speed at which the user is moving;
the type of location; and
any combination of the aforementioned factors.

7. The method of claim 1, wherein the specified time period dynamically varies based on one selected from the group consisting of:
the day of week;
the remaining power of the mobile device;
whether the present location exists in the location database; and
any combination of the aforementioned factors.

8. The method of claim 1, wherein periodically determining the present location of the user includes periodically determining the present location of the user using one selected from the group consisting of:
a satellite positioning system (GPS);
a cellular tower positioning system;
a Wi-Fi positioning system; and
any combination of the aforementioned positioning systems.

9. The method of claim 1, wherein the present location of the user is determined at a period that is determined based on one selected from the group consisting of:
the remaining power of the mobile device;
the speed at which the user is moving;
the type of location; and
any combination of the aforementioned factors.

10. The method of claim 1, including:
determining the number of times that the user has visited the present location;
determining whether the number of times that the user has visited the present location exceeds a threshold; and
if the number of times that the user has visited the present location exceeds the threshold, determining a type of the present location.

11. The method of claim 10, wherein determining a type of the present location includes one selected from the group consisting of:
querying a database that includes a plurality of locations associated with types;
querying the user to provide a type of the present location;
querying a service operator to provide a type of the present location; and
any combination of the aforementioned operations.

12. The method of claim 1, wherein recording the route that the user travels from the previous location that the user is leaving to another interesting location includes:
determining whether the user has stopped moving;
if the user has stopped moving,
determining whether the user has stopped at an interesting location; and
if the user has stopped at an interesting location, recording the route that the user traveled from the previous location to the interesting location.

13. The method of claim 12, wherein determining whether the user has stopped moving includes determining whether the user has stopped moving for a specified time period.

14. A system, comprising:
one or more processors;
memory; and
one or more programs stored in the memory, the one or more programs comprising instructions to:
periodically determine a present location of a user, the present location being one of an interesting location and an uninteresting location;
compare the present location of the user to a previous location of the user;
determine whether the present location is within a specified distance of the previous location;
in accordance with a determination that the present location is within the specified distance of the previous location:
determine whether the user has been at the present location for a specified time period; and
in accordance with a determination that the user has been at the present location for the specified time period, store the present location in a location database;
in accordance with a determination that the present location is beyond the specified distance of the previous location,
determine whether the previous location that the user is leaving is an interesting location, wherein an interesting location includes locations that have been visited by one or more users of a plurality of users a specified number of times, wherein the plurality of users includes the user of the mobile device;
in accordance with a determination that the previous location that the user is leaving is an interesting location, record a route that the user travels from the previous location that the user is leaving to another interesting location; and in accordance with a determination that the previous location is an uninteresting location, not recording a route that the user travels from the previous location until an interesting location is reached.

15. A non-transitory computer readable storage medium storing one or more programs configured for execution by a computer, the one or more programs comprising instructions to:

periodically determine a present location of a user, the present location being one of an interesting location and an uninteresting location;

compare the present location of the user to a previous location of the user;

determine whether the present location is within a specified distance of the previous location;

in accordance with a determination that the present location is within the specified distance of the previous location:

determine whether the user has been at the present location for a specified time period; and in accordance with a determination that the user has been at the present location for the specified time period, store the present location in a location database;

in accordance with a determination that the present location is beyond the specified distance of the previous location, determine whether the previous location that the user is leaving is an interesting location, wherein an interesting location includes locations that have been visited by one or more users of a plurality of users a specified number of times, wherein the plurality of users includes the user of the mobile device;

in accordance with a determination that the previous location that the user is leaving is an interesting location, record a route that the user travels from the previous location that the user is leaving to another interesting location; and in accordance with a determination that the previous location is an uninteresting location, not recording a route that the user travels from the previous location until an interesting location is reached.

* * * * *